(12) United States Patent
Yerebakan et al.

(10) Patent No.: US 12,505,535 B2
(45) Date of Patent: Dec. 23, 2025

(54) DETERMINING A LOCATION AT WHICH A GIVEN FEATURE IS REPRESENTED IN MEDICAL IMAGING DATA

(71) Applicant: Siemens Healthineers AG, Forchheim (DE)

(72) Inventors: Halid Yerebakan, Carmel, IN (US); Gerardo Hermosillo Valadez, West Chester, PA (US); Yoshihisa Shinagawa, Downingtown, PA (US); Matthias Wolf, Coatesville, PA (US); Anna Jerebko, Lexington, MA (US); Yu Zhao, West Chester, PA (US); Simon Allen-Raffl, West Chester, PA (US); Katharina Schmidler Burk, Cedar City, UT (US); Mahesh Ranganath, Malvern, PA (US)

(73) Assignee: Siemens Healthineers AG, Forchheim (DE)

( * ) Notice: Subject to any disclaimer, the term of this patent is extended or adjusted under 35 U.S.C. 154(b) by 386 days.

(21) Appl. No.: 17/806,156

(22) Filed: Jun. 9, 2022

(65) Prior Publication Data

US 2023/0005136 A1    Jan. 5, 2023

(30) Foreign Application Priority Data

Jul. 2, 2021    (EP) .................................... 21183428

(51) Int. Cl.
*G06T 7/246*    (2017.01)
*A61B 5/055*    (2006.01)
(Continued)

(52) U.S. Cl.
CPC ............ *G06T 7/0012* (2013.01); *A61B 5/055* (2013.01); *G06T 2207/10081* (2013.01)

(58) Field of Classification Search
CPC ......... G06T 7/0012; G06T 2207/10081; G06T 2207/10088; G06T 2207/10116;
(Continued)

(56) References Cited

U.S. PATENT DOCUMENTS

| 9,792,531 B2 | 10/2017 | Georgescu et al. |
| 2014/0270366 A1* | 9/2014 | Wang ................. G06F 18/2148 382/103 |
| 2017/0337682 A1 | 11/2017 | Liao et al. |

FOREIGN PATENT DOCUMENTS

| CN | 106408022 A | * | 2/2017 | ........... G06K 9/6211 |
| CN | 109189809 B | * | 1/2020 | |

OTHER PUBLICATIONS

Hast, An Efficient Descriptor Based on Radial Line Integration for Fast Non-invariant Matching and Registration of Microscopy Images, Springer International Publishing AG 2017, J. Blanc-Talon et al. (Eds.): ACIVS 2017, LNCS 10617, pp. 723-734, 2017 (Year: 2017).*

(Continued)

*Primary Examiner* — Vu Le
*Assistant Examiner* — Lei Zhao

(57) ABSTRACT

A computer implemented method and apparatus for determining a location at which a given feature is represented in medical imaging data is disclosed. A first descriptor for a first location in first medical imaging data is obtained. The first location is the location within the first medical imaging data at which the given feature is represented. A second descriptor for each of a plurality of candidate second locations in second medical imaging data is obtained. A similarity metric indicating a degree of similarity with the first descriptor is calculated for each of the plurality of candidate second locations. A candidate second location is selected from among the plurality of candidate second locations based on the calculated similarity metrics. The location at (Continued)

which the given feature is represented in the second medical imaging data is determined based on the selected candidate second location.

20 Claims, 8 Drawing Sheets

(51) Int. Cl.
    *G06T 7/00* (2017.01)
    *G06T 7/73* (2017.01)
(58) Field of Classification Search
    CPC . G06T 2207/30048; G06T 2207/30061; G06T 7/246; G06T 7/73; G06T 2207/20104; G06T 2207/20216; A61B 5/055; G06V 10/462; G06V 10/751; G06V 2201/03; G06V 10/761
    See application file for complete search history.

(56) References Cited

OTHER PUBLICATIONS

Chen, Motion Correction in Multimodal Intraoperative Imaging, IEEE Transactions on Biomedical Circuits and Systems, vol. 14, No. 4, Aug. 2020 (Year: 2020).*
DelMarco, Application of a Dynamic Feature Selection Algorithm to Multi-Sensor Image Registration, Signal Processing, Sensor Fusion, and Target Recognition XVI, edited by Ivan Kadar, Proc. of SPIE vol. 6567, 656717, (2007) (Year: 2007).*
Facciolo, Integral Images for Block Matching, Image Processing On Line, 4 (2014), pp. 344-369. https://doi.org/10.5201/ipol.2014.57 (Year: 2014).*
Flanagan, Enhanced Normalized Mutual Information for Localization in Noisy Environments, Proceedings of 2020 IEEE Applied Signal Processing Conference (ASPCON) (Year: 2020).*
Extended European Search Report in EP application No. 21183428.8 dated Dec. 17, 2021, 11 pages.
DelMarco, Stephen, et al. "Application of a dynamic feature selection algorithm to multi-sensor image registration." Signal Processing, Sensor Fusion, and Target Recognition XVI. vol. 6567. SPIE, 2007.
Tang, Chunming, Yan Dong, and Xiaohong Su. "Automatic registration based on improved SIFT for medical microscopic sequence images." 2008 Second International Symposium on Intelligent Information Technology Application. vol. 1. IEEE, 2008.
Krigg, Scott: "Local Feature Design Concepts, Classification and Learning"; Computer Vision Metrics. Survey, Taxonomy and Analysis; XP055506091; ISBN: 978-1-4302-5930-45_4; DOI: 10.1007/978-1-4302-5930-45_4; pp. 131-189.
Hast, Anders, Gustaf Kylberg, and Ida-Maria Sintorn. "An Efficient Descriptor Based on Radial Line Integration for Fast Non-invariant Matching and Registration of Microscopy Images." International Conference on Advanced Concepts for Intelligent Vision Systems. Springer, Cham, 2017.
Chen, Fang, et al. "Motion Correction in Multimodal Intraoperative Imaging." IEEE Transactions on Biomedical Circuits and Systems 14.4 (2020): 671-680.
Balakrishnan, Guha, et al. "VoxelMorph: a learning framework for deformable medical image registration." IEEE transactions on medical imaging 38.8 (2019): 1788-1800.
Yan, Ke, et al. "SAM: Self-supervised Learning of Pixel-wise Anatomical Embeddings in Radiological Images." IEEE Transactions on Medical Imaging (2022).
Ghesu, Florin C., et al. "Robust multi-scale anatomical landmark detection in incomplete 3D-CT data." International Conference on Medical Image Computing and Computer-Assisted Intervention. Springer, Cham, 2017.
Cai, Jinzheng, et al. "Deep lesion tracker: Monitoring lesions in 4d longitudinal imaging studies." Proceedings of the IEEE/CVF Conference on Computer Vision and Pattern Recognition. 2021.

* cited by examiner

DETERMINING A LOCATION AT WHICH A GIVEN FEATURE IS REPRESENTED IN MEDICAL IMAGING DATA

CROSS-REFERENCE TO RELATED APPLICATION

This application claims the benefit of priority from European Patent Application No. 21183428.8, filed on Jul. 2, 2021, the contents of which are incorporated by reference.

TECHNICAL FIELD

The present framework relates to a method and apparatus for determining a location at which a given feature is represented in medical imaging data.

BACKGROUND

Comparison of medical images occurs frequently in clinical settings. For example, in clinical decision making, the progression of a patient's disease over time can be as, if not more, important than the current status of that disease. In order to help assess the progression of a patient's disease, medical imaging, e.g., radiology, of a region of the patient's body including the disease may be performed at different points in time, for example several times over the course of a year. The resulting images may be compared, for example by a physician, in order to track the disease over time and hence assess the progression of the disease.

However, differences in the images, for example differences resulting from the precise positioning of the patient relative to the imaging equipment when the images are captured, and/or the imaging modality or protocols according to which the images are captured, can make it difficult to locate a given feature (e.g., a particular tumor) represented in one image, in other ones of the images.

Image registration and landmark detection are existing techniques that can help address this problem by attempting to spatially align different images (or imaging data sets) with one another.

In image registration techniques, different sets of imaging data are transformed into one coordinate system. In a known image registration technique, a cost function for a given voxel-to-voxel mapping of one image to another image in voxel space is calculated, and the mapping is adjusted so as to minimize the cost function. As a result, the location of a given feature represented by the two images should be the same in the common coordinate system. However, this technique has drawbacks. For example, the ability of this technique to perform accurately and/or reliably is typically limited to cases where the two images both, as a whole, represent the same part or very similar parts of the patient's body and/or cases where the same or similar imaging modality or protocol is used. Moreover, as it is based on a voxel-to-voxel mapping of one image to another image, this technique is computationally demanding, and hence has a limited ability to provide real-time or near real time results without extensive pre-processing of the imaging data and/or without use of large computational resources.

In landmark detection techniques, a landmark detector first identifies well known locations ("landmarks") in the body by applying trained classifiers to both one image and another image. The identified landmarks are mapped between the two images. The images can be broadly spatially aligned according to the landmarks, and as a result a given feature represented in the two images should also be broadly aligned. However, this technique also suffers from drawbacks. For example, it relies on the images containing landmarks that can be detected by the trained classifiers. Moreover, the training of the classifiers to identify landmarks in images can be computationally demanding, and requires expert annotation of a large number of images to form a training data set, which is time consuming.

It would be desirable to provide a technique for determining the location at which a given feature is represented in medical imaging data, but which mitigates at least some of the drawbacks of the prior art.

SUMMARY

According to one aspect, there is provided a computer implemented method of determining a location at which a given feature is represented in medical imaging data. The medical imaging data includes an array of elements each having a value. A first descriptor for a first location in first medical imaging data is obtained, the first location being the location within the first medical imaging data at which the given feature is represented, the first descriptor being representative of values of elements of the first medical imaging data located relative to the first location according to a first predefined pattern. A second descriptor for each of a plurality of candidate second locations in second medical imaging data is obtained, each second descriptor being representative of values of elements of the second medical imaging data located relative to the respective candidate second location according to the first predefined pattern. For each of the plurality of candidate second locations, a similarity metric is calculated. The similarity metric indicates a degree of similarity between the first descriptor and the second descriptor for the candidate second location. A candidate second location is selected from among the plurality of candidate second locations based on the calculated similarity metrics. The location at which the given feature is represented in the second medical imaging data is determined based on the selected candidate second location.

DETAILED DESCRIPTION

Figure 1:
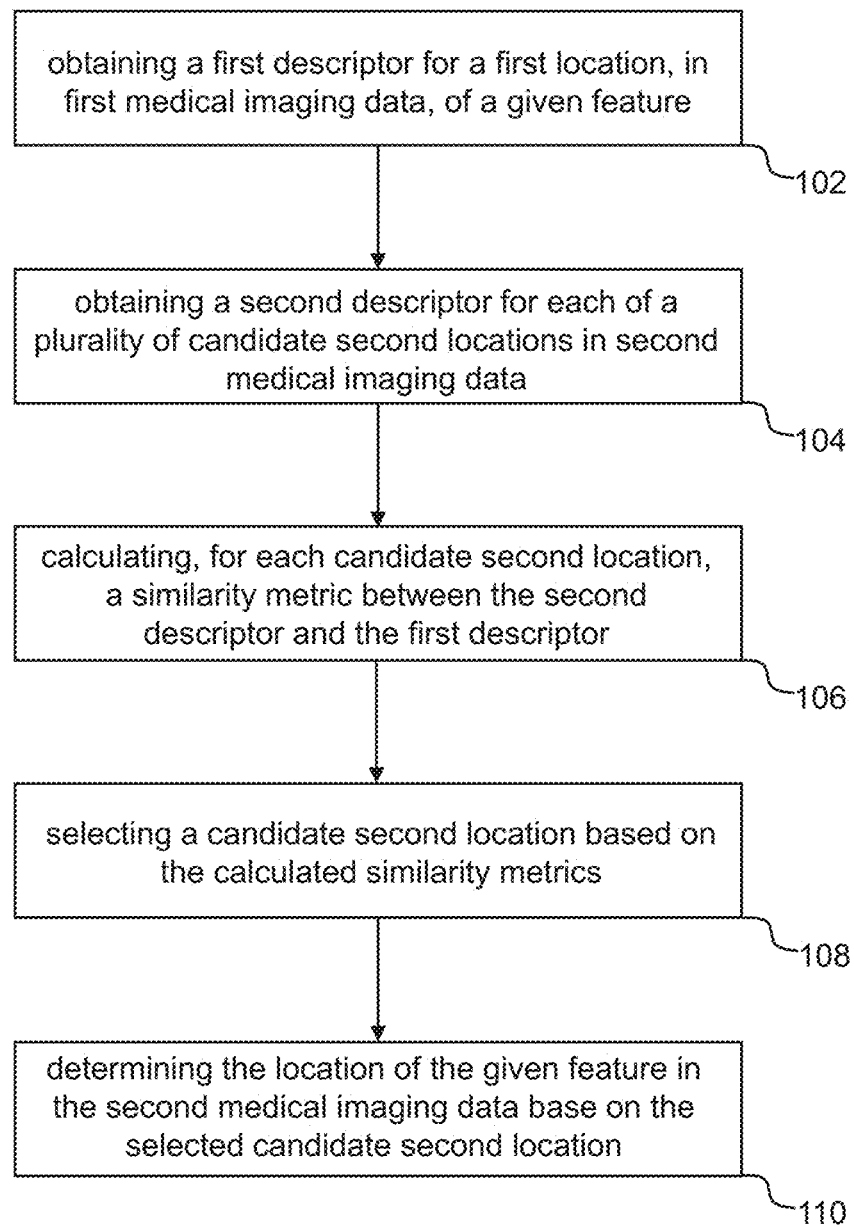
FIG. 1 is flow diagram illustrating a method according to an example.

Referring to FIG. 1, there is illustrated a computer implemented method of determining a location at which a given feature is represented in medical imaging data.

Figure 2:
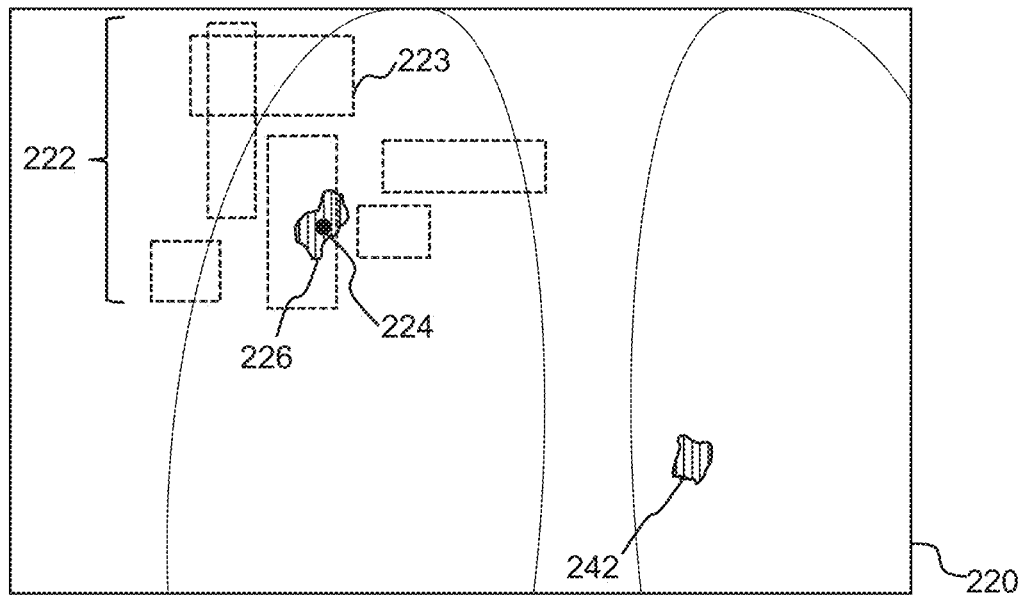
FIG. 2 is a diagram illustrating first medical imaging data according to an example.
Figure 3:
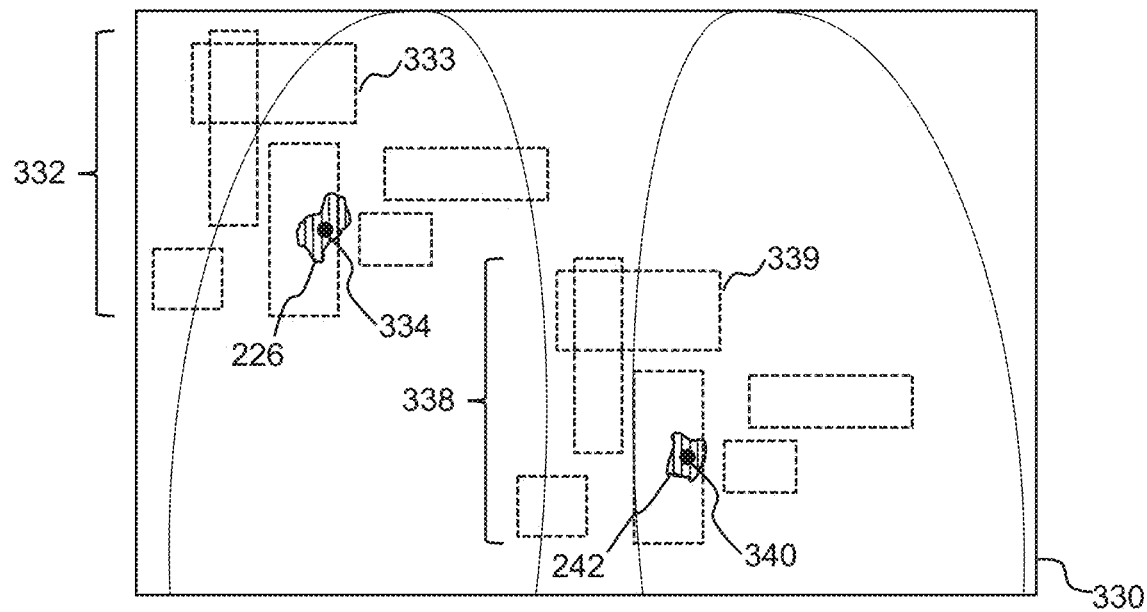
FIG. 3 is a diagram illustrating second medical imaging data according to an example.
Figure 4:
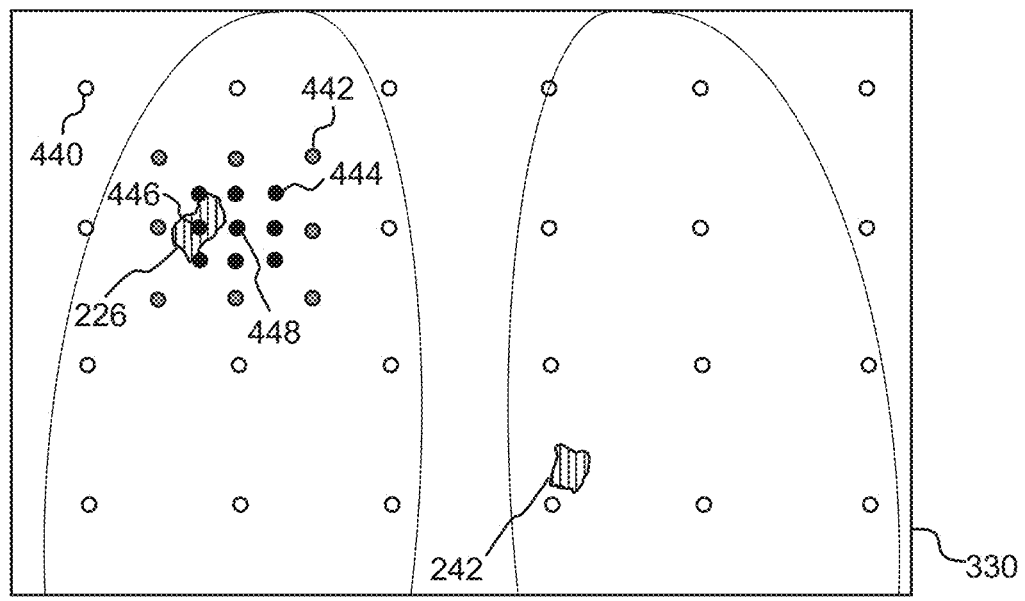
FIG. 4 is a diagram illustrating second medical imaging data according to another example.
Figure 5:
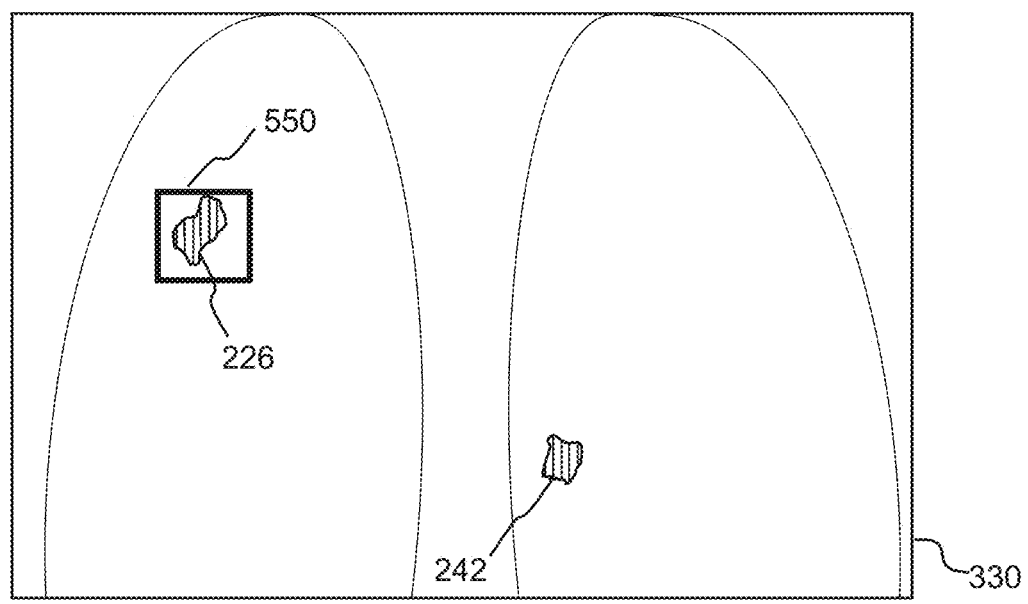
FIG. 5 is a diagram illustrating output data according to an example.

Representations of example medical imaging data with which the method may be used are illustrated in FIGS. 2 to 5. Medical imaging data may be that captured from performing medical imaging on a patient, for example Computed Tomography (CT), Magnetic Resonance Imaging (MRI), X-ray, or other imaging techniques. FIG. 2 illustrates a representation of first medical imaging data 220. FIGS. 3 to 5 each illustrate a representation of second medical imaging data 330. In each case, the medical imaging data comprises an array of elements each having a value. For example, the medical imaging data may comprise a 2-Dimensional array of pixels, each pixel having at least one value. As another example, the medical imaging data may comprise a 3-Dimensional array of voxels, each voxel having at least one value. The at least one value may correspond to or otherwise be representative of an output signal of the medical imaging technique used to generate the medical imaging data. For example, for X-ray imaging, the value of an element (e.g., pixel) may correspond to or represent a degree to which X-rays have been detected at the particular part of the imaging plane corresponding to the element. As another example, for Magnetic Resonance Imaging, the value of an element (e.g., voxel) may correspond to or represent a rate at which excited nuclei, in a region corresponding to the element, return to an equilibrium state. In some examples, each element may only have one value. However, in other examples, each element may have or otherwise be associated with multiple values. For example, the multiple values of a given element may represent the values of respective multiple signal channels. For example, each signal channel may represent a different medical imaging signal or property of the imaging subject. In some examples, the at least one value may comprise an element (e.g., pixel or voxel) intensity value. For example, an output signal from the medical imaging may be mapped onto a pixel or voxel intensity value, for example a value within a defined range of intensity values. For example, for a greyscale image, the intensity value may correspond to a value in the range 0 to 255, where 0 represents a 'black' pixel and 255 represents a 'white' pixel, for example. As another example, for example as in the case of USHORT medical imaging data, the intensity value may correspond to a value in the range 0 to 65536. As another example, in a color image (e.g., where different colors represent different properties of the imaging subject) each pixel/voxel may have three intensity values, e.g., one each for Red, Green, and Blue channels. It will be appreciated that other values may be used. In any case, the medical imaging data may be rendered into an image, for example as schematically illustrated in FIGS. 2 to 5. In the illustrated examples, the first medical imaging data 220 and the second medical imaging data 330 are data captured by performing medical imaging on the same patient, specifically the same region of the same patient, but at different times. In some examples, the modality (i.e., the medical imaging method by which the data was captured) and/or the protocol (i.e., the specific parameters by which a given method of medical imaging was performed) of the medical imaging may alternatively or additionally be different between the first medical imaging data 220 and the second medical imaging data 330.

In any case, as can be seen from FIGS. 2 to 5, the first medical imaging data 220 and the second medical imaging data 330 differ. Specifically, in this example, the data differ in the positioning of the region in which the imaging data was captured relative to the patient—the region is offset to the right in the sense of the Figures in the second medical imaging data 330 of FIGS. 3 to 5 as compared to the first medical imaging data 220 in FIG. 2. Nonetheless, certain features 226, 242 are represented in both the first medical imaging data 220 and the second medical imaging data 330. In this example, a given feature 226 represented in the medical imaging data is a lesion 226 in the right lung of the patient. It will be appreciated however that in examples the given feature may be any feature, e.g., any particular part of the imaging subject (e.g., including internal cavities and the like), represented in the medical imaging data.

In an example use case (referred to hereinafter for illustrative purposes), a physician may be reviewing the rendering of the first medical imaging data 330 (as per that illustrated in FIG. 2). The physician may be interested in assessing the progression of a given feature, e.g., the lesion 226, since the previous, second medical imaging data 330 was captured. The location 224 at which the given feature 226 is represented in the first medical imaging data 220 is known. However, the location at which the given feature 226 is represented in the second medical imaging data 330 is not known and may be difficult or burdensome for the physician to ascertain by visual inspection alone. The method illustrated in FIG. 1 determines the location at which the given feature 226 is represented in the second medical imaging data 330.

Referring again to FIG. 1, in broad overview, the method comprises:

in step 102, obtaining a first descriptor for a first location 224 in first medical imaging data 220, the first location 224 being the location within the first medical imaging data 220 at which the given feature 226 is represented, the first descriptor being representative of values of elements 222 of the first medical imaging data 220 located relative to the first location 224 according to a first predefined pattern;

in step 104, obtaining a second descriptor for each of a plurality of candidate second locations 334, 340, 440, 448 in second medical imaging data 330, each second descriptor being representative of values of elements 332, 338 of the second medical imaging data 330 located relative to the respective candidate second location 334, 340, 440, 448 according to the first predefined pattern;

in step 106, calculating, for each of the plurality of candidate second locations 334, 340, 440, 448 a similarity metric indicating a degree of similarity between the first descriptor and the second descriptor for the candidate second location 334, 340, 440, 448;

in step 108, selecting a candidate second location 334, 448 from among the plurality of candidate second locations 334, 340, 440, 448 based on the calculated similarity metrics; and in step 110, determining the location 334, 446 at which the given feature 226 is represented in the second medical imaging data 330 based on the selected candidate second location 334, 448.

Accordingly, a technique for determining the location 334, 446 at which a given feature 226 is represented in medical imaging data 330 is provided for. Specifically, a known location at which a given feature 226 is represented in a first medical image 220 is used to determine the location at which the given feature is represented in a second, e.g., previous, medical image 330 of a patient. This may, for example, reduce the burden for a physician in finding the location at which the given feature 226 is represented in the second medical image 330.

Moreover, this determination is based on determining the similarity between descriptors for the known location at which the feature 226 is represented in the first medical image 220 and for each of plurality of candidate locations in the second medical image 330. This may provide for fast, efficient, and/or flexible feature location.

For example, determining similarity between the descriptors for the known first location 224 and the candidate second locations 334, 340 may be significantly less computationally expensive as compared to Image Registration techniques where every pixel/voxel in one image is mapped to every pixel/voxel in another image by optimizing a cost function. Accordingly, for a given computational budget, the presently disclosed method may provide results significantly faster than Image Registration based methods. This may, in turn, allow for real-time or near real-time interaction with the image data.

Basing the descriptor on element (e.g., pixel of voxel) values located relative to the given location 224 in a predetermined distribution pattern allows for the surroundings and spatial context of the feature 226 to be encoded into the descriptor. This provides for the location at which the given feature 226 is represented in the second medical imaging data 330 to be determined in a reliable, efficient and/or flexible manner.

For example, such descriptors may encode the surroundings of the feature and candidate locations of interest, rather than attempting to map every pixel of one image to a pixel of another image as per Image Registration techniques. Accordingly, even where the first 220 and second 330 images are relatively different (e.g., in the overall region of the body they depict), the location at which the given feature is represented in the second medical image may nonetheless be reliably determined (e.g., as compared to Image Registration techniques which, due to the attempt to map every pixel between images, are typically limited to images that are relatively similar). The presently disclosed technique may therefore provide accurate results for a broader range of first and second images, and hence may be more flexibly applied.

As another example, determining similarity between the descriptors for the known first location 224 and the candidate second locations 334, 340 need not rely on the presence in the medical images 220, 330 of 'landmarks' that classifiers have been trained to detect in the images, as per Landmark Detection based methods. According, the presently disclosed method may be more flexible with respect to the types of medical images to which it may be effectively applied. Moreover, by basing the location determination on a similarity between descriptors, the presently disclosed technique can be applied for any given feature, rather than e.g., a landmark on which a classifier has been trained as per landmark detection-based methods. The presently disclosed technique may therefore provide accurate results for a broader range features, and hence may be more flexibly applied. Determining the similarity between the descriptors allows for the location at which a given feature is represented in medical imaging data to be determined without the use of trained classifiers as per landmark detection based techniques, and hence the time and effort associated with preparing a training data set for the classifier, as well as the computational load of training the classifier, can be saved. Accordingly, the presently disclosed method may allow for determination of a location at which a given feature 226 is represented in medical imaging data in an efficient manner.

As mentioned, the method comprises, in step 102, obtaining the first descriptor for the first location 224 in first medical imaging data 220. The first location 224 is the location within the first medical imaging data 220 at which the given feature 226 is represented. The first descriptor is representative of values of elements 222 of the first medical imaging data 220 located relative to the first location 224 according to a first predefined pattern.

In some examples, the first descriptor may be output from a descriptor model applied to the first medical imaging data for the first location 224. The descriptor model may be configured to calculate a descriptor for a given location 224 based on the values of elements located relative to the given location 224 according to the first predefined pattern.

In some examples, the first descriptor may be obtained from a database (not shown). For example, the descriptor for the first location 224 may have already been calculated (for example by applying the descriptor model), and stored in the database, for example in association with the first location 224. For example, the database may store a plurality of first descriptors each in association with the corresponding first location in the medical imaging data on the basis of which the first descriptor was determined. Accordingly, in some examples, the method may comprise selecting the first location 224 from among the plurality and extracting the first descriptor associated with the selected first location 224.

In either case, a descriptor for a given location 224 may be a vector comprising a plurality of entries, each entry being representative of values of a set of one or more elements, the sets of one or more elements being located relative to the given location 224 according to the first predefined pattern. For example, each entry may be representative of the values of the elements located within a respective one or more of a plurality 222 of predefined boxes 223 (i.e., rectangular regions) located relative to the given location 224 according to the first predefined pattern. It will be appreciated that, where the medical imaging data exits in three spatial dimensions, the term 'box' as used herein may refer to a cuboidal region or volume.

In some examples, each entry of the descriptor may be representative of the values of the elements located within a respective one of a plurality 222 of predefined boxes 223. For example, each entry of the descriptor may be an average of the values of the elements located within a respective one of a plurality 222 of predefined boxes 223. That is, each entry may be the sum of the values of the elements located within a particular box 223, divided by the number of elements included in the box 223. For example, as illustrated in FIG. 2, for the first location 224, there are a plurality 222 of predefined boxes 223 (i.e., notional regions) distributed in the first medical imaging data 220 in a particular pattern 222. The first descriptor for the first location 224 may be a vector, each entry of which is the average value of the elements of the first medical imaging data 220 located within a respective one of the boxes 223. Using the average value (e.g., as compared to the sum) helps provide that each vector entry is within the same range, independent of the size of the box for which it is calculated. As described in more detail below, this may, in turn, help provide for robust and/or reliable determination of similarity between descriptors.

Figure 6:
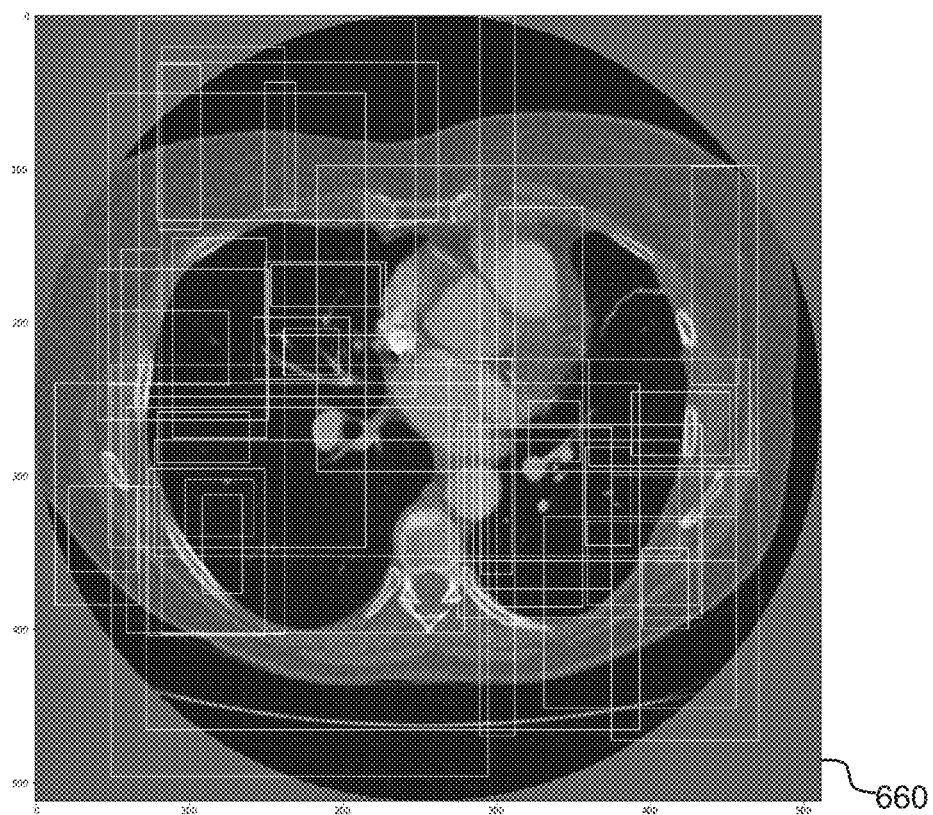
FIG. 6 is a diagram illustrating first medical imaging data according to an example.

In some examples, the predefined pattern and/or the predefined boxes (e.g., the size and/or aspect ratio of each box) may be randomly or pseudo-randomly generated. In some examples, a descriptor may be determined using many boxes 223, for example 1000 boxes, and accordingly the descriptor may be a vector having many entries (e.g., 1000 entries). For example, referring briefly to FIG. 6, there is presented, for illustrative purposes, a medical imaging data set 660 to which a large number of predefined boxes (shown as white rectangular outlines) have been applied in order to determine a descriptor for a given location (not shown) in the medical imaging data 660.

The descriptor may encode the spatial context of the given location 224 at which a given feature is represented, and hence in turn may provide a compact representation of the surroundings of a given feature. The calculation of such descriptors may be relatively computationally inexpensive and fast, for example as compared to comparatively dense feature representations, for example as may be used in a landmark detection technique. This may help allow, for example, for the method to be performed (and hence results returned) quickly.

In some examples, the descriptor model that calculates the descriptor may be applied to 'raw' medical imaging data. However, in other examples, the descriptor model may be applied to integral image data (also known as a summed area table) of the first medical imaging data. In integral image data, the value for a given element is the sum of values of all of the elements above and to the left of the given element in the image data. For example, integral image data for the first medical imaging data 220 may be generated and the first descriptor may be calculated on the basis of the integral image data for the first medical imaging data 220. The use of integral image data allows for faster computation of the descriptors. In some examples, this may, in turn, help allow for the results of the method to be returned faster.

In examples where an integral image is used, the sum of values of elements of a box 223 with opposite corner locations $(x_1,y_1,z_1)$, $(x_2,y_2,z_2)$ is given, in terms of the corresponding Integral image I, by $(I(x_2,y_2,z_2)+I(x_2,y_1,z_1)+I(x_1,y_2,z_1)+I(x_1,y_1,z_2)-(I(x_1,y_2,z_2)+I(x_2,y_1,z_2)+I(x_2,y_2,z_1)+I(x_1,y_1,z_1)))$. In this expression, $I(x_i,y_j,z_k)$ is the value of the element in the integral image I at the location x=i, y=j, and z=k, where i, j, and k are element indices. For a given box 223, this sum may be divided by the total number of elements contained within the box 223 to calculate the average element value for the box 223. The average element value for each box may be used as respective entry in a vector constituting the first descriptor.

It will be appreciated that, in some examples, descriptors other than the specific example described above may be used. For example, in some examples, Haar-like descriptors may be used, i.e., a descriptor where each entry represents a difference between the sums of element values within each of a plurality of boxes defined in the image data. In some examples, the descriptor may be a gradient descriptor, for example in which each entry represents one or more image gradients in a respective one of a plurality of regions of the medical imaging data. For example, an image gradient for a given region may be based on a change in the values (e.g., intensity values) between elements within the given region. In some examples, the descriptor may be such that each entry is the value of a respective one of a plurality of elements randomly distributed in the medical imaging data relative to the first location 224. In some examples, the descriptor for a given location may be such that each entry is the aggregate of the values of elements intersecting with a respective one of a plurality of randomly orientated rays, each ray originating from the given location. In each case, the descriptor for a given location is representative of values of elements of the medical imaging data located relative to the given location according to a first predefined pattern.

Nonetheless, is noted that the inventors have identified that the use of a descriptor for a given location in which each entry is representative (e.g., an average) of the values of the elements located within a respective one of a plurality 222 of predefined boxes 223 located relative to the given location in a predefined (e.g., randomly generated) distribution pattern, provides for particularly fast yet accurate location determination.

In some examples, the first location 224 for which the descriptor is calculated or otherwise obtained may be specified by a user. For example, a representation of the first medical imaging data 220 may be displayed to the user, and the user may specify the location 224 of a given feature 226 of interest, for example by clicking on the representation at the first location 224 at which the given feature 226 is represented. This user specified location may then be taken as the first location 224. The first descriptor may then be calculated or otherwise obtained based on this first location 224.

In some examples, the first location 224 may be output from a computer implemented method. For example, the first medical imaging data 220 may have been pre-processed by a computer implemented method (not shown) to identify a given feature 226 in the first medical imaging data 220, and output the first location 224 at which the given feature 226 is represented. This output may be provided directly, and/or stored in a database. The first descriptor may then be calculated or otherwise obtained based on this first location 224.

In some examples, the first location 224 may be obtained from a database (not shown). For example, the database may store one or more locations at which a respective one or more features are represented in one or more medical imaging data sets. The first medical imaging data 220 may be extracted from the database along with the one or more locations. A particular one of the locations may be selected as the first location 224, for example based on a desire or instruction to determine the location at which the given feature 226 at that location is represented in second medical imaging data 330. The first descriptor may then be calculated or otherwise obtained based on this first location 224.

In any case, the first descriptor for the first location 224 in the first medical imaging data 220 is obtained.

As mentioned, in step 104, the method comprises obtaining a second descriptor for each of a plurality of candidate second locations 334, 340 in second medical imaging data 330.

Each second descriptor is representative of values of elements 332, 338 of the second medical imaging data 330 located relative to the respective candidate second location 334, 340 according to the first predefined pattern. The second descriptor may be the same as the first descriptor in the sense that, for a given location (e.g., the first location 224 or any one of the second candidate locations 334, 340), the descriptor is representative of values of given elements of the associated medical imaging data located relative to the given location according to the first predefined pattern. For example, the same descriptor model that was applied to the first medical imaging data 220 to generate the first descriptor for the first location 224 may be applied to the second medical imaging data 330 to generate the second descriptor for each of the plurality of candidate second locations 334, 340. For example, referring to FIGS. 2 and 3, the boxes 332, 338 and the location of each of those boxes relative to each candidate second location 334, 340 used to calculate the second descriptor for each of those candidate second locations 334, 340 are the same as the boxes 222 and the location of each of those boxes relative to the first location 224 used to calculate the first descriptor for the first location 224. Whichever type of descriptor is used, that descriptor for the first location 224 in the first medical imaging data 220 and that descriptor each of the plurality of second candidate locations 334, 340 in the second medical imaging data 330 are obtained.

As described in more detail below, in some examples (e.g., described below with reference to FIG. 3), each candidate second location 334, 340 may be a location at which a respective previously detected feature 226, 242 is represented in the second medical imaging data 330. In other examples, (e.g., as described below with reference to FIG. 4) the candidate second locations 440 may be locations distributed through the second medical imaging data in a second predefined pattern.

In any case, a second descriptor for each of a plurality of candidate second locations 334, 340, 440 in second medical imaging data 330 is obtained.

As mentioned, the method comprises, in step 106 calculating, for each of the plurality of candidate second locations 334, 340, 440, a similarity metric indicating a degree of similarity between the first descriptor and the second descriptor for the candidate second location 334, 340, 440.

In some examples, the similarity metric may comprise the normalized mutual information similarity between the first descriptor and the second descriptor. For example, the normalized mutual information similarity between the first descriptor and the second descriptor may be determined as follows. A first histogram is formed in which the entries in the first descriptor are placed into equally sized bins x between the minimum entry value and the maximum entry value of the first descriptor. The counts in first histogram are normalized to get the probability distribution Px(x) of the entries of the first descriptor across the bins x. A second histogram is formed in which the entries in the second descriptor are placed into equally sized bins y between the minimum entry value and the maximum entry value of the second descriptor. The counts in second histogram are normalized to get the probability distribution Py(y) of the entries of the second descriptor across the bins y. A joint histogram of the entries of the first descriptor and the second descriptor ranging between the respective minimum and maximum values is determined. Each bin of the joint histogram is an equally sized 2-dimensional bin, the first dimension X corresponding to the entry from the first descriptor, and the second dimension Y corresponding to the associated entry from the second descriptor. For example, if the first entry of the first descriptor was q and the first entry of the second descriptor was p, then the 2D bin x, y of the joint histogram which covers a range of first descriptor values including p and covers a range of second descriptor values including q, would receive a count. The counts in the joint histogram are normalized to get the probability distribution Pxy(x,y) of the entries of the first and second descriptors across the bins x, y. The mutual information similarity I between the first descriptor and the second descriptor may then be calculated as $$I = \sum_y \sum_x P_{XY}(x, y) \log\left(\frac{P_{X,Y}(x, y)}{P_X(x)P_Y(y)}\right) \quad (1)$$

The higher the mutual information similarity I, the higher the degree of similarity between the first descriptor and the second descriptor. Using normalized mutual information similarity may provide for robust, reliable and/or flexible determination of the similarity. For example, the mutual information similarity is independent of differences in relative scale of the entries of the first descriptor as compared to the second descriptor. For example, using mutual information, an accurate similarity metric may be determined even if the overall 'brightness' (e.g., the intensities that are the values of the elements of the medical imaging data) differs between the first medical imaging data and the second medical imaging data. As another example, mutual information may provide an accurate similarity, even in cases where different protocols and/or modalities of medical imaging have been used (and e.g., accordingly different value ranges used or achieved) or for example where the medical images have been transformed, e.g., inverted or scaled. Accordingly, the use of mutual information similarity in this way may provide for determination of similarity that is robust to, e.g., non-structural variations between the first and second medical imagine data, which may in turn allow for the method to be applied reliably to a wider range of images, which in turn may provide more flexibility in the type of images with which the method may be provided.

As mentioned, in some examples, the descriptor entries are representative of values of elements contained within associated boxes 223, 333, 339. As mentioned, in these examples, each entry of the respective descriptors being an average of the values of elements contained within respective boxes 223, 333, 339 may help ensure the entries within a descriptor are within a certain range independent of box size. This, in turn, may facilitate the use of mutual information similarity, as the bin into which a given entry is placed is accordingly dependent on the average value of the elements within the box, but not on the size of the box.

In some examples, other similarity metrics between the first descriptor and the second descriptor may be used. For example, cosine similarity, Euclidean distance, and/or cross correlation may alternatively or additionally be used. Nonetheless, the inventors have identified that the mutual information similarity metric may provide for particularly robust, reliable and/or flexible determination of the similarity metric, and accordingly for particularly robust, reliable and/or flexible determination of the location at which the given feature is represented in the second medical imaging data.

In any case, for each second candidate location 334, 340 a similarity metric indicating a degree of similarity between the first descriptor and the second descriptor for the candidate second location 334, 340 is calculated.

As mentioned, the method comprises, in step 108, selecting a candidate second location 334 from among the plurality of candidate second locations 334, 340 based on the calculated similarity metrics; and in step 110 determining the location 334 at which the given feature 226 is represented in the second medical imaging data 330 based on the selected candidate second location 334.

In some examples, selecting the candidate second location 334 may comprise selecting the candidate second location 334 having the similarity metric indicating the highest degree of similarity among the similarity metrics of the plurality of candidate second locations 334, 340. For example, the candidate second location 334 with the highest mutual information similarity metric may be selected. In some examples, determining the location at which the given feature 226 is represented comprises determining, as the location at which the given feature 226 is represented in the second medical imaging data 330, the selected candidate second location 334. In some examples, determining the location may be responsive to a determination that the similarity metric between the first descriptor for the first location and the second descriptor for the selected candidate second is above a threshold value. This may help ensure that the location at which the given feature is represented in the second medical imaging data 330 is only determined in cases where there is a certain degree of confidence in the determination. This may, in turn, help provide for reliable determination of the location at which the given feature is represented in the second medical imaging data 330.

As mentioned, in some examples (e.g., as illustrated in FIG. 3), each candidate second location 334, 340 may be a location at which a respective previously detected feature 226, 242 is represented in the second medical imaging data 330. In other examples, (e.g., as illustrated in FIG. 4) the candidate second locations 440 may be locations distributed through the second medical imaging data in a second predefined pattern. The way in which the location of the given feature may be determined in each of these examples scenarios is now described in more detail with reference to FIGS. 3 and 4.

Referring first to FIG. 3, in this example scenario, the second medical imaging data 330 represents a first feature 226 and a second feature 242. In this example, these features 226, 242 have been detected in the second medical imaging data 330, for example previously by a physician, or by an automated method. The respective locations 334, 340 of these features 226, 242 in the second medical imaging data 330 have been recorded as part of this previous detection. Accordingly, the respective locations 334, 340 of these previously detected features 226, 340 are known. However, it is not known which of these two locations 334, 340 is the location at which the given feature 226 in the first medical imaging data 220 is represented in the second medical imaging data 330. In other words, it is not known which of these features 226, 224 corresponds to the given feature 226 represented in the first medical imaging data 220. In these examples, the candidate second locations may therefore be taken as the locations 334, 340 in the second medical imaging data 330 at which the previously detected features 226, 242 are represented. A similarity metric between the second descriptors for each of the candidate second locations 334, 340 and the first descriptor for the first location 224 may be calculated. In this example, the candidate second location 334 with the highest similarity metric may be selected, and the selected candidate second location 334 may be determined as the location 334 at which the given feature 226 is represented in the second medical imaging data 330.

Referring to FIG. 4, the second medical imaging data 330 represents a first feature 226 and a second feature 242. However, in the example scenario of FIG. 4, the locations at which these features 226, 242 are represented in the second medical imaging data 330 is not known. In this example, the candidate second locations 440 are locations distributed through the second medical imaging data 330 in a second predefined pattern. In some examples, as illustrated in FIG. 4, the second predefined pattern may be a regular arrangement, with each second candidate location 440 (represented in FIG. 4 by the open circles 440) spaced apart from its neighbors in a grid. For example, this arrangement may span a region, for example the whole of, the second medical imaging data 330. As such, the candidate second locations represent a spatially distributed sample of locations within the second medical imaging data 220 (and hence at which the given feature could be represented).

The candidate second locations being distributed in the second predefined pattern may allow for the location at which the given feature 226 is represented in the second medical imaging data 330 to be estimated in a computationally efficient way, for example as compared to determining a descriptor for every voxel of the second medical imaging data 330.

In the example of FIG. 4, the similarity metric between the second descriptor for each one of the candidate second locations 440 and the first descriptor may be calculated. As illustrated in FIG. 4, the second descriptor for the candidate second location 448 closest to the represented feature 226 has the highest degree of similarity with the first descriptor. Accordingly, the candidate second location 448 is selected. The location at which the given feature 226 is represented in the second medical imaging data 330 may then be determined based on this selected candidate second location 448.

For example, in some examples, the selected candidate second location 448 may be taken as an estimate of the location at which the given feature 226 is represented in the second medical imaging data. However, in other examples, this estimate may be refined by defining further candidate locations 442, 444 (based on the selected candidate second location 448) in successively more fine-grained patterns (see e.g., the pattern of grey circles 442, and subsequently of black circles 444, in FIG. 4). Accordingly, an accurate yet efficient determination of the location at which a given feature 226 is represented in the second medical imaging data 330 ma be provided for, even where no locations of any features in the second medical imaging data 330 are known.

Specifically, in these examples, determining the location 446 at which the given feature 226 is represented in the second medical imaging data 330 may comprise: determining, based on the selected candidate second location 448, a plurality of candidate third locations 442 in the second medical imaging data 330. For example, the candidate third locations 442 may be defined as locations in the region of (i.e., local to) the selected candidate second location 448. For example, the candidate third locations 442 may be locations distributed through the second medical image data 330 in a third predefined pattern in the region of the selected second location 448. For example, the third predefined pattern may be the same as or similar to that of the second predefined pattern. However, in some examples (as illustrated in FIG. 4), a distance between the candidate third locations 442 in the third predefined pattern may be less than a distance between the candidate second locations 440 in the second predefined pattern.

The method may then comprise obtaining a third descriptor for each of the plurality of candidate third locations 442 in the second medical imaging data 330, each third descriptor being representative of values of elements of the second medical imaging data 330 located relative to the respective candidate third location 442 according to the first predefined pattern. For example, the third descriptor may be the same as, i.e., may have been calculated in the same way as, the first and second descriptors as described above.

In some examples, a scale of the first predefined pattern associated with the third descriptors may be reduced as compared to a scale of the first predefined pattern associated with the second descriptors. Taking a descriptor based on a plurality of boxes (not shown in FIG. 4) arranged in the first predefined pattern as an example, while the shape and the spatial pattern of the boxes may be the same for the second descriptors and the third descriptors, the size of the boxes and/or the distances between each box and the respective location 442 for the third descriptor may be scaled down (i.e., reduced) as compared to the size of the boxes and/or the distances between each box and the respective location 440 for the second descriptor. This may provide that the third descriptors encode more fine-grained detail of the second medical image data 330 in the region of the selected candidate second location 448. This may help provide for accurate determination of the location at which the given feature 226 is represented in the second medical imaging data 330.

In these examples, the method may then comprise calculating, for each of the plurality of candidate third locations 442, a similarity metric indicating a degree of similarity between the first descriptor and the third descriptor for the candidate third location 442. For example, the similarity metric may be the same as, i.e., may be calculated in the same way as, the similarity metric as used between the first descriptor and the second descriptor. The method may then comprise selecting a candidate third location 448 from among the plurality of candidate third locations 442 based on the calculated similarity metrics indicating the degree of similarity between the first descriptor and the respective third descriptors. For example, as illustrated in FIG. 4, the candidate third location 448 with the highest similarity metric may be selected. The method may then comprise determining the location at which the given feature 226 is represented in the second medical imaging data 330 based on the selected candidate third location 448.

In some examples, the selected candidate third location 448 may be taken as an estimate of the location at which the given feature 226 is represented in the second medical imaging data. However, in other examples, this estimate may be further refined by defining further candidate locations 444 based on (e.g., in the region of) the selected third candidate location 448, and repeating the above described method for these further candidate locations. For example, as illustrated in FIG. 4, a further set of candidate locations 444 are defined in the region of the selected candidate third location 448. In this example the further candidate location 446 will have a descriptor with the highest similarity metric with the first descriptor, and hence may be selected. The location at which the given feature 226 is represented in the second medical imaging data 330 may then be determined at the selected further candidate location 446. It will be appreciated that although three levels of hierarchical granularity are shown in FIG. 4, fewer or more levels of hierarchical granularity may be employed in order to determine the location at which the given feature 226 is represented in the second medical imaging data 330. Nonetheless, using such a hierarchical method may allow for the location to be accurately determined in a quick and efficient manner, even where no locations of any features in the second medical imaging data 330 are known.

It is noted that the elements (e.g., boxes) according to which the respective second, third or further descriptors may calculated for each of the respective candidate second, third or further locations are not shown in FIG. 4, for clarity.

In any case, the location at which the given feature 226 is represented in the second medical imaging data 330 is determined. In some examples, the method may further comprise generating output data indicating the determined location at which the given feature 226 is represented in the second medical imaging data 330.

For example, the output data may comprise a coordinate or pixel/voxel index corresponding to the determined location 334, 446 within the second medical imaging data 330. In some examples, the output data may further comprise a reference to the second medical imaging data 330 within which location has been determined. In some examples, the output data may comprise the second medical imaging data itself (or a portion thereof). In some examples, the output data may comprise an image (or data for an image) in which an indicator indicating the determined location is overlaid onto a rendering of the second medical imaging data 330. For example, as illustrated in FIG. 5, a representation of the second medical imaging data 330 is shown, and overlaid onto (or otherwise included in) the representation is an indicator 550 indicating the location at which the given feature 226 is represented in the second medical imaging data 330. In this example, the indicator is a box centered on the determined location. However in other examples other indicators may be used, such as a marker or dot or other symbol overlaid (or otherwise included) at the determined location; or for example an arrow or pointer or other label pointing at or connected or otherwise indicating the determined location. The output data may allow for an indication to be provided to a user, e.g., a physician, as to the determined location at which the given feature 226 is represented in the second medical imaging data 330. The user may therefore, e.g., compare the representation of the given feature 226 in both the first medical image data 220 and the second medical image data 330. As a result, the user may, for example, make an assessment as to the differences between the given feature 226, e.g., make an assessment as to the progression of a disease of which the feature 226 may be an expression.

In some examples, the output data may further comprise the first location and a reference to the first medical imaging data 220 or the medical imaging data 220 itself. This may allow for an association between the locations at which the given feature 226 is represented in both the first medical imaging data 220 and the second medical imaging data 330 to be determined. In some examples, the output data may be stored in a storage device. For example, the output data may be stored in a database. This may allow for the output data to be referred to, for example by a user or by an automated downstream process (not shown).

In some examples, the method may comprise transmitting the output data to a display device to display a representation of the second medical image data 330 and an indicator 550 indicating, on the representation of the second medical image data, the determined location at which the given feature is represented. For example, the display device (not shown) may be a computer monitor or other display screen of a computer. For example, the displayed representation may be similar to that shown in FIG. 5, where the indicator 550 is overlaid onto the representation of the second medical imaging data 330. Any of the example indicators mentioned above may be used. This may allow for a user, e.g., a physician, to immediately and easily appreciate the location at which the given feature 226 is represented in the second medical imaging data 330, which may, for example, allow for assessments based on the given feature to be made more quickly and with minimal burden.

In the above examples, only one given feature 226 is referred to. However, in some examples, there may a plurality of given features represented in the first medical imaging data 220. In these examples, it may be desirable to determine the location at which each of the plurality of given features is located in the second medical imaging data 330. In some examples, the method according to any of the examples described with reference to FIGS. 1 to 6 may be employed sequentially to the plurality of given features, for example once for each of the plurality of given features. However, as described in more detail below, in some examples, the determination of each location may be performed concurrently.

Figure 7:
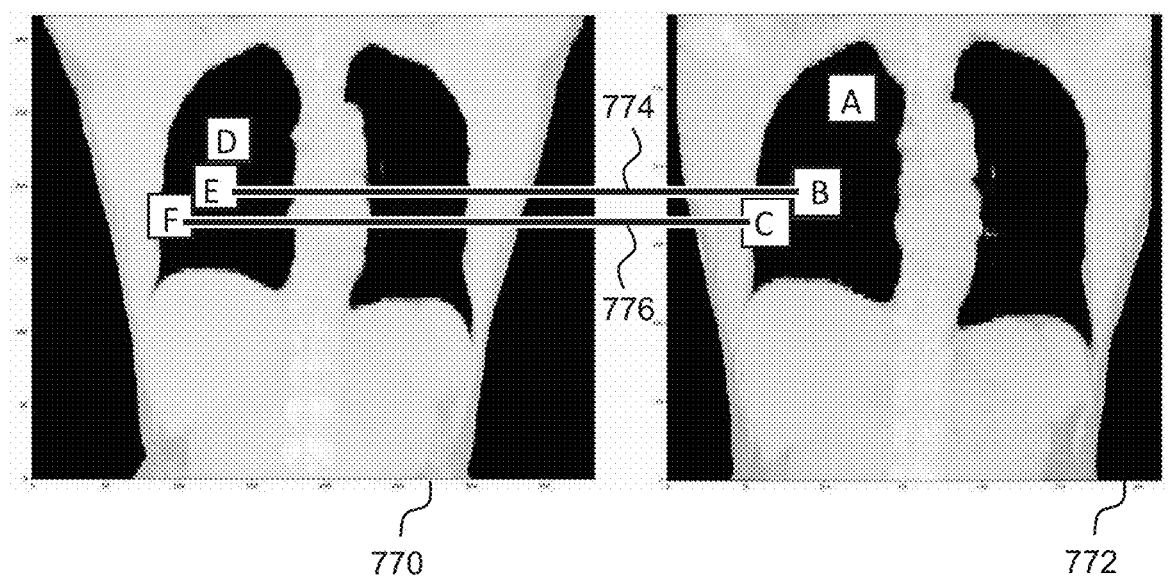
FIG. 7 is a diagram illustrating output data according to another example.

Referring to FIG. 7, there is a representation of first medical imaging data 772, and a representation of second medical imaging data 770. The first medical imaging data 772 represents three given features A, B, C (shown only schematically in FIG. 7), and the second medical imaging data 770 represents three features D, E, F (shown only schematically in FIG. 7). In this example, all of the features A, B, C, D, E, F have been detected in the images, and the locations at which they are represented within the respective medical imaging data is known. However, it is not known which of the features D, E, F in the second medical imaging data 770 correspond to the given features A, B, C in the first medical imaging data. In this example, the locations at which the given features A, B, C are represented in the first medical imaging data 772 are the first locations, and the locations at which the features D, E, F are represented in the second medical imaging data 770 are the respective candidate second locations.

In this example, a said first descriptor for a said first location (not shown) in the first medical imaging data 770 is obtained for each of the plurality of said given features A, B, C. In this example, the method may comprise calculating said similarity metric between the first descriptor and the second descriptor for all pairs of the first locations A, B, C and candidate second locations D, E, F. For example, the similarity metric according to any one of the examples described above may be determined between the descriptor for the first location of the given feature A and the descriptor for the second locations of each of the features D, E, F; and the same may be performed for the other given features B, C. For example, in this example, there will be nine similarity metrics calculated, one for each of the pairings A-D, A-E, A-F, B-D, B-E, B-F, C-D, C-E, C-F.

The method may then comprise assigning each first location A, B, C a different one of the candidate second locations D, E, F based on the calculated similarity metrics between the pairs of first locations and candidate second locations. For example, the assignment may be by solving the maximal matching problem for a bipartite graph based on the similarity metrics of all of the pairs. For example, the assignments may be made using a Linear Sum Assignment algorithm, for example the "linear sum assignment" routine in a Python-NumPy library. For example, the assignment may be made by minimizing the function $\Sigma_i \Sigma_j C_{ij} X_{ij}$ where C is a cost matrix where C[i,j] is the 'cost' of assigning first location i a candidate second location j (e.g., inversely proportional to the similarity metric thereof), X is a Boolean matrix where X[i,j]=1 if row i is assigned to column j, and wherein the minimization is subject to the constraint that there is at most one candidate second location j assigned per first location i. For example, as a result of this process, the following assignments may be determined: A-D, B-E, C-F.

In some examples, assigning a first location A, B, C a candidate second location D, E, F may be responsive to a determination that the similarity metric between the first descriptor for the first location A, B, C and the second descriptor for the candidate second location D, E, F is above a threshold value. For example, the threshold value could be set, for example, at 70% similarity. This may help ensure that there is a certain degree of confidence in the assignment. For example, while given feature A may have been assigned to feature D in the second medical imaging data 770 as part of the linear sum assignment, it may be determined that the similarity metric for this pair A-D is below the threshold value, and hence the assignment of D to A may not be made. However, the similarity metrics for the pairings B-E and C-F may be above the threshold, and hence these assignments may be made.

The method may then comprise determining, for each said first location B, C, as the location at which the respective said given feature B, C is represented in the second medical imaging data 770, the second candidate location E, F assigned to the first location. For example, according to the assignments B-E and C-F made in this example, the method may comprise determining the locations of features E and F as the location at which features B and C, respectively, are represented in the second medical imaging data 770.

The method described above with reference to FIG. 7 may help prevent inconsistencies that could otherwise occur if the method described above with reference to FIGS. 1 to 6 were applied sequentially and separately to each of a plurality of given features. Accordingly, this may allow for more reliable determination of the location at which a given feature is represented in the second medical imaging data 770 in the case where there are a plurality of given features.

In some examples, the output data may comprise associations or links 774, 776 between each first location B, C and the candidate second location E, F that has been assigned to the first location B, C. For example, the output data may be similar that represented in FIG. 7, where representations of the first medical imaging data 772 and the second medical imaging data 770 are presented adjacent to one another, and where there is a first link 774 drawn between the first location B and the candidate second location E to which it has been assigned, and a second link 776 drawn between the first location C and the candidate second location F to which it has been assigned. These links 774, 776 may act as indicators of the locations E, F at which the given features B, C are represented in the second medical imaging data 770. This output data may be stored and/or displayed, for example as described above. This may allow a user to immediately and easily identify the location at which each given feature B, C represented in the first medical imaging data 772 is represented in the second medical imaging data 770, and indeed vice versa.

Figure 8:
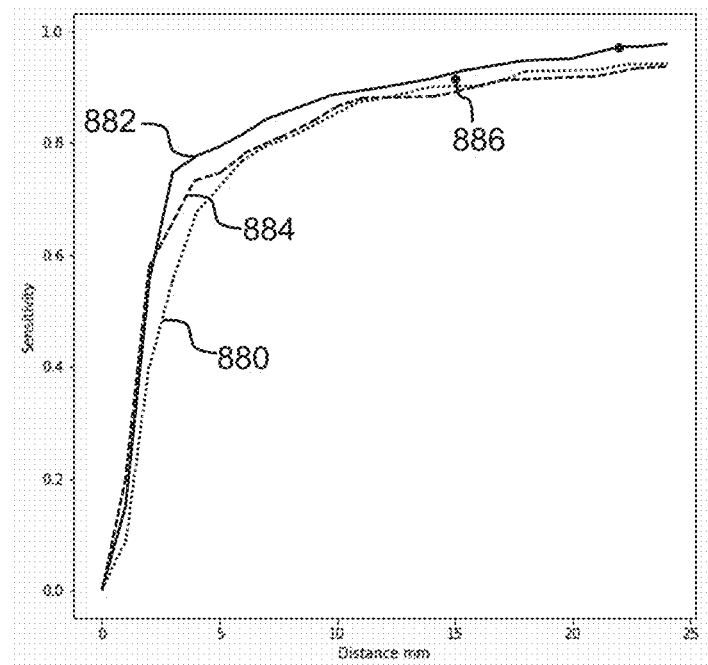
FIG. 8 is a graph a plot of distance against sensitivity for the method disclosed herein according to examples as well as comparative methods.

To serve as an illustration of the performance of examples of the method disclosed herein, a study was performed. Specifically, a study was performed for examples described above with reference to FIG. 4 where a hierarchical search for the location at which the given feature 226 is represented in the second medical imaging data 330 is performed. In this study, the method was performed on a benchmark dataset of lung lesion pairs each across two images taken at different time points (i.e., first medical imaging data and second medical imaging data, respectively). In this study, the distance from the estimated location at which the given feature is represented in the second medical imaging data to the true location at which the given feature is represented in the second medical imaging data, was calculated, for each of the dataset pairs. The precision of the estimation under a series of distance thresholds was then calculated. This provides a measure of the sensitivity of the estimation as a function of the distance from the true location at which the given feature is represented in the second medical imaging data. FIG. 8 illustrates a plot of this sensitivity as a function of the distance (in mm) for the above referenced example of the presently disclosed method (solid line 882) as well as comparative methods (dashed line 884, dotted line 880, and black circles 886) as applied to the dataset. The comparative methods were each Image Registration based methods. As can be seen from the plot in FIG. 8, the presently disclosed method can surpass the performance of the studied Image Registration based methods. Specifically, in about 92% of the cases, the studied example method was able to determine the location at which the given feature was represented in the second medical imaging data 330 to within 15 mm of its true location. In the studied example method, the location was not only able to be determined accurately, but also quickly, specifically in under a few seconds. According, the presently disclosed method can provide for fast and accurate determination of the location at which the given feature is represented in the second medical imaging data 330.

Figure 9:
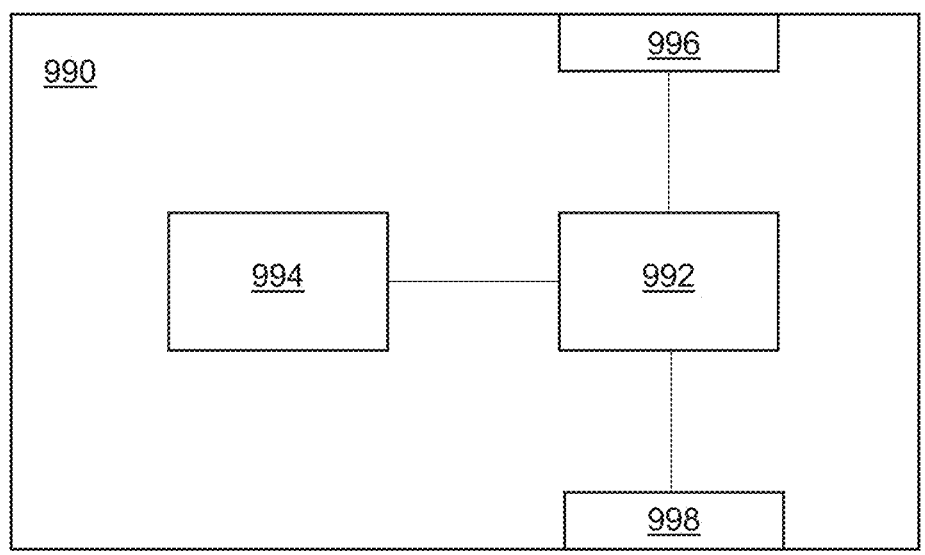
FIG. 9 is a diagram illustrating an apparatus according to an example.

Referring to FIG. 9, there is illustrated an apparatus 990 according to an example. The apparatus 990 comprises an input interface 996, an output interface 998, a processor 992, and a memory device 994. The processor 992 and the memory device 994 may be configured to perform the method according to any one of the examples described above with reference to FIGS. 1 to 7. The memory device 994 may store instructions which, when executed by the processor 992, cause the processor 992 to perform the operations of the method according to any one of the examples described above with reference to FIGS. 1 to 7. The instructions may be stored on any computer readable medium, for example, one or more non-transitory computer readable media.

For example, the input interface 996 may receive the first descriptor for a first location 224, A, B, C in first medical imaging data 220, 772 and a second descriptor for each of a plurality of candidate second locations 334, 340, 440, D, E, F in second medical imaging data 330, 770, the processor 992 may implement the method according to any of the examples described above with reference to FIGS. 1 to 7, and the processor 992 may output, via the output interface 998, data indicating the determined location at which the given feature is represented in the second medical imaging data 330, 330, for example the output data as described above with reference to FIG. 5 or 7. In some examples, the output data may be transmitted to n storage (not shown) for example implementing a database, so that the output data is stored in the storage. In some examples, the output data may be transmitted to a display device (not shown) to allow a user to review the output data, for example as described above with reference to FIG. 5 or 7. In some examples, the output data may be stored, alternatively or additionally, in the memory device 994.

The apparatus 990 may be implemented as a processing system and/or a computer. It will be appreciated that the methods according to any one of the examples described above with reference to FIGS. 1 to 7 are computer implemented methods, and that these methods may be implemented by the apparatus 990.

Figure 10:
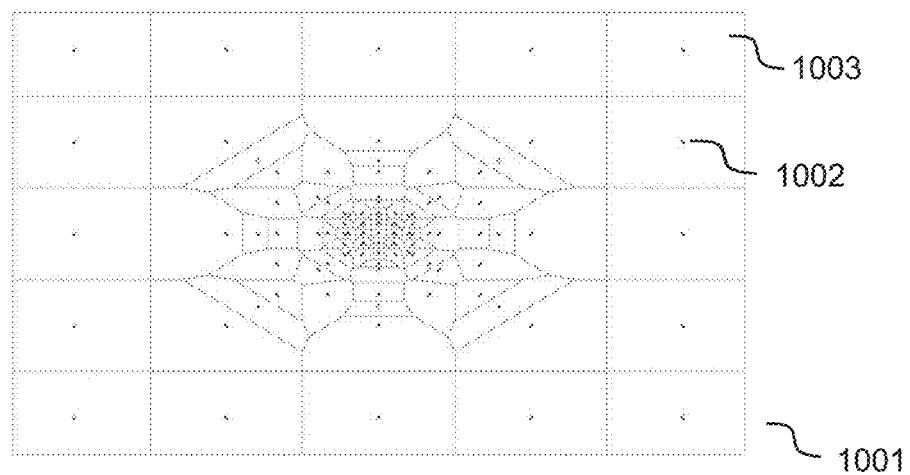
FIG. 10 is a diagram illustrating first/second medical imaging data according to a further example.

FIG. 10 shows another example for possible first and/or second predefined patterns. Specifically, the first predefined pattern may be a sampling grid 1001 comprising a plurality of grid points 1002. The grid points 1002 are distributed in first or second medical imaging data 220, 330. The grid points 1002 are located relative to either the first location 224 or the candidate second locations 334, 340, 440. For the sake of easy reference, the first location 224 or the candidate second locations 334, 340, 440 are together referred to as given location in the following. In particular, the sampling grid 1001 may be centered with respect to the given location, with the given location sitting in the center of the sampling grid 1001.

The sampling grid 1001 may be a regular grid which has one or more axis or planes of symmetry. The planes or axis of symmetry may run through the respective given location. Further one or more axis or planes of symmetry may intersect in the respective given location. According to some examples, the sampling grid 1001 respectively fully spans the respective imaging spaces of the first and second medical imaging data. According to some examples, the sampling grid 1001 may be two-dimensional. According to other examples, the sampling grid 1001 may be three-dimensional.

Each sampling point 1002 of the sampling grid 1001 may correspond to an entry of a vector, the vector being the descriptor for the given location. Thereby, each entry may be based on the values of elements of the underlying image data located in the vicinity of the respective sampling point 1002. Thus, in other words, the process may comprise calculating a first descriptor based on the sampling grid 1001 applied to first medical imaging data 220 with respect to the first location 224. This first descriptor is then compared to a plurality of second descriptors of a plurality of candidate second locations 334, 340, 440 in a second medical imaging data set 220 as explained before. Thereby, the second descriptors may respectively be obtained by applying the sampling grid 1001 to the second medical imaging data 330 relative to the respective candidate second location 334, 340, 440. Self-speaking this way of descriptor-extraction may also be combined with other aspects as explained above, e.g., the hierarchical refinement introduced in connection with FIG. 4 and the third candidate locations 448.

As shown in FIG. 10, the sampling points 1002 according to some examples are not equidistant, but the average distance between the sampling points 1002 increases with increasing distance to the given location. That is, the density of the sampling points per unit area or volume decreases with increasing distance to the given location.

Further, each sampling point 1002 may be conceived as a center point or node of an associated sampling area 1003 defined around the respective sampling point 1002. In a way, the sampling grid 1001 may be seen as comprising a regular pattern of sampling areas 1003 which respectively cover the first or second medical imaging data sets 220, 330 if applied thereon. Sampling areas 1003 of neighboring sampling points may share a common border or margin (which may be a line or plane).

If the distance between individual sampling points 1002 gets larger with increasing distance to the given location, this has the consequence that also the sampling areas get larger with increasing distance to the given location.

According to some examples, the descriptor for any given location (e.g., the first location, or the candidate second locations, or the candidate third locations) is a vector comprising a plurality of entries, each entry being representative of the values of the elements located relative to a respective one of the plurality of grid points 1002. Specifically, an entry may be based on an average property or feature of elements comprised in the respective sampling area 1003. Specifically, the average may be based on the values of the elements. This is exemplified in FIGS. 11 and 12.

Figure 11:
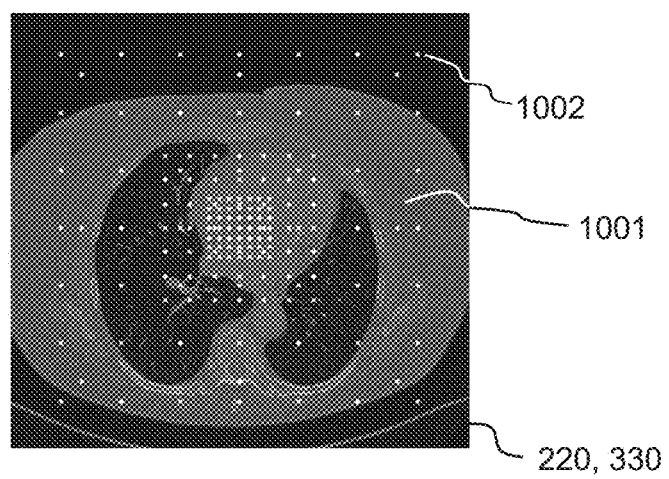
FIG. 11 is a diagram illustrating first/second medical imaging data according to a further example.
Figure 12:
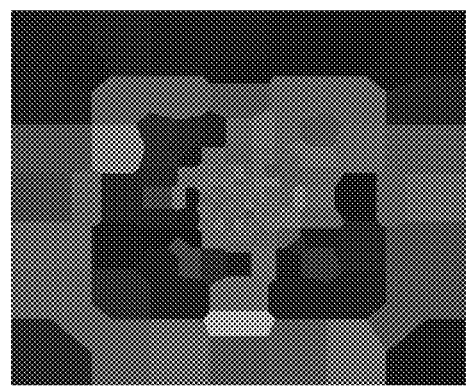
FIG. 12 is a diagram illustrating first/second descriptors according to a further example.

In embodiments where the spacing between individual sampling points 1002 increases with increasing distance from the given location as in FIGS. 10 to 12, elements in the vicinity of the given location contribute to the descriptor to a greater extent than elements which are more distant. This is because the contributions of the latter are increasingly averaged out.

The inventors have recognized that the usage of sampling grids for descriptor extraction constitutes a fast and at the same time very accurate way of encoding image information for feature matching. In particular, the usage of sampling grids 1001 spanning the entire relevant image space is computationally fast. The decrease in sampling point density may make sure that more relevant elements of a medical imaging data set contribute more than others.

According to some examples, the sampling grids 1001 are defined based on generalized coordinates or world coordinates to take into account the fact that pixel spacings could be different in different studies. Therefore, descriptor voxel value offsets may be calculated for each volumetric image accounting for pixel spacings and specified scaling factors for the selected refinement level. Once the offset coordinates are computed, the descriptor may be based on pixel intensity values on those locations. Similar anatomical locations would produce similar descriptors with this approach.

According to some examples, a number of different predetermined sampling grids 1001 may be provided. These sampling grids 1001 may be different in terms of the number and/or density of sampling points 1002. The sampling grids 1001 may be suited for different use cases and/or contents and/or types of medical imaging data sets. For instance, there may be dedicated sampling grids 1001 for MRI medical imaging data sets and different dedicated sampling grids 1001 for CT medical imaging data sets. Further, there may be dedicated sampling grids for different body regions and or organs shown in the medical imaging data. Optionally, the sampling grid 1001 to be used for matching locations in first and second medical imaging data may be selected from the plurality of predetermined sampling grids 1001 based on the first and/or second medical imaging data. This may involve determining a type and or a content of the first and/or second medical imaging data and select the sampling grid 1001 from the plurality of sampling grids 1001 on that basis. With that, an optimized sampling grid 1001 may be selected for the respective use case.

As an alternative, the sampling grid 1001 may be generated/adapted specifically for the respective image data. According to some examples, this may be carried out by a trained algorithm trained to generate (predefine) a sampling grid 1001 for the ensuing descriptor extraction.

Figure 13:
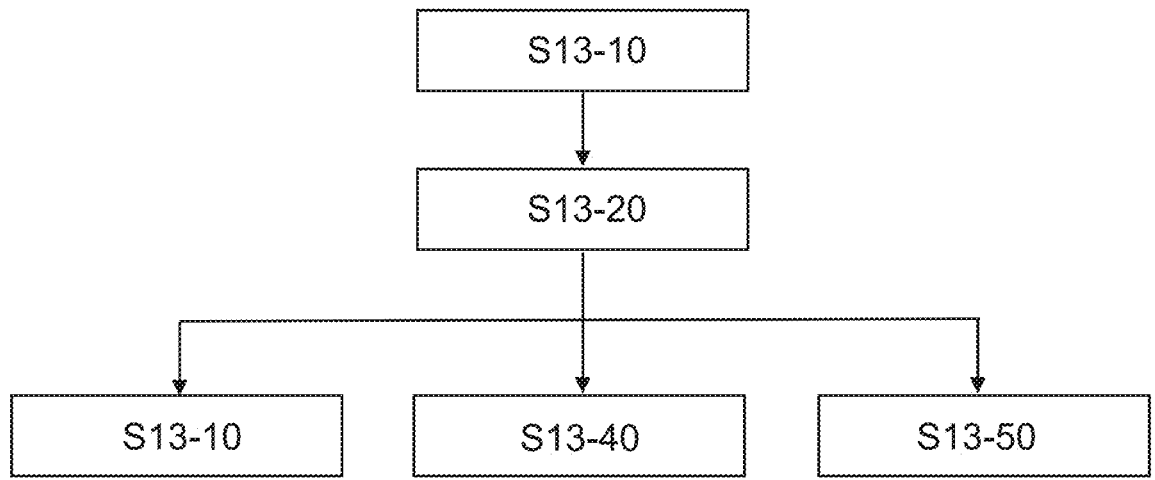
FIG. 13 is flow diagram illustrating a method according to a further example.

In FIG. 13, a schematic flow diagram depicting optional method steps is shown. FIG. 13 is directed to a workflow for providing a starting point for the iterative search for the second location and/or verifying results obtained by way of finding similar descriptors as herein described.

In a first step S13-10, an image registration between the first and second medical imaging data is determined.

Providing at least one image registration, according to some examples, may in general comprise registering a target image (e.g., the first medical imaging data 220) with a reference image (e.g., the second medical imaging data 330). According to some examples, this may comprise obtaining a transformation function between target and reference image data that determines a relationship between the coordinate systems of the target image data and the reference image data such that each physiological location in the target image is mapped to the same physiological location in the reference image and vice versa. Thus, the transformation may comprise a plurality of individual displacement vectors respectively associated with the pixels or voxels (i.e., the elements) of the target image and the reference image.

According to some examples, the registration may comprise a rigid registration. A rigid registration may comprise a registration in which the coordinates of pixels or voxels in one image data are subject to rotation and translation in order to register the image data to another image data. According to some examples, the registration may comprise an affine registration. An affine registration may comprise a registration in which the coordinates of data points in one image are subject to rotation, translation, scaling and/or shearing in order to register the image to another image. Thus, a rigid registration may be considered to be a particular type of affine registration. According to some examples, the registration may comprise a non-rigid registration. A non-rigid registration may provide different displacements for each pixel or voxel of the image data to be registered and can, for example, use non-linear transformations, in which the coordinates of pixels in one image are subject to flexible deformations in order to register the image to another image. Non-linear transformations may, according to some examples, be defined using vector fields such as warp fields, or other fields or functions, defining an individual displacement for each pixel/voxel in an image. Rigid image registration is very effective in cases when no deformations are expected. In comparison to rigid image registration, non-rigid image registration has a significantly greater flexibility, as non-rigid image registrations can manage local distortions between two image data sets but can be more complex to handle.

In a second step S13-20, an estimated location of the given feature in the second medical imaging data 330 is determined based on the registration. Specifically, the first location 224 may be transformed into the coordinate space of the second medical imaging data 330 by subjecting it to the coordinate transformation obtained with the registration.

The ensuing steps S13-30, S13-40, S13-50 are directed to the usage of the registration in the location matching process. They are optional and may also be combined.

At step S13-30, the estimated location may be used as candidate second location. In other words, the registration is used to provide an "educated guess" for the second location in order to reduce the number of iterations required to find the selected second location.

At step S13-40, the estimated location may be used to verify the selected candidate second location. In particular, the distance between the estimated location and the selected candidate second location may be checked. If the selected candidate second location and the estimated location are too far apart, this may be an indication that the determination of the selected candidate second location via the discriminator extraction failed. In this regard, it should be noted that the registration is oftentimes more robust but may lead to less accurate results as compared to the feature extraction. Accordingly, the registration may allow for a good sanity check.

Furthermore, the registration may be used as a fallback option. This is exploited at step S13-50, where the estimated location may be used as the selected candidate second location or, respectively, as the location at which the given feature is represented in the second medical imaging data 330, e.g., if it is determined at step S13-40 that the selected candidate second location determined by the descriptor matching cannot be quite right.

Figure 14:
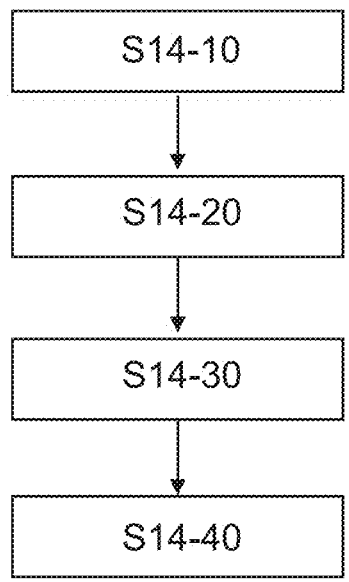
FIG. 14 is flow diagram illustrating a method according to a further example.

A further way of optionally performing a sanity check is depicted in FIG. 14.

At a first step S14-10, a verification descriptor for each of a plurality of candidate verification locations in the first medical imaging data is obtained. Thereby, each verification descriptor is representative of values of elements of the first medical imaging data located relative to the respective candidate verification location according to the first predefined pattern. The predefined pattern and the descriptor extraction may be of the same types as explained in connection with FIGS. 1 to 12.

At a second step S14-20 for each of the plurality of candidate verification locations, a similarity metric is calculated, the similarity metric indicating a degree of similarity between the second descriptor of the selected candidate second location and the verification descriptor for the candidate verification location. Thereby, essentially the same procedures may be applied as explained in connection with FIGS. 1 to 12.

At a third step S14-30, a candidate verification location is selected from among the plurality of candidate verification locations based on the calculated similarity metrics.

At a fourth step S14-40, the quality of the location determination in the second medical imaging data is determined based on a comparison between the selected candidate verification location and the first location. If the determination of the selected candidate second location was sound, the selected candidate verification location and the first location should approximately lie at the same spot. If the selected candidate verification location and the first location are too far apart, this may be an indication that the location matching via the discriminator extraction failed for the particular first and second medical imaging data. In this case, a registration may be performed and used as a fallback as described in connection with FIG. 13.

Figure 15:
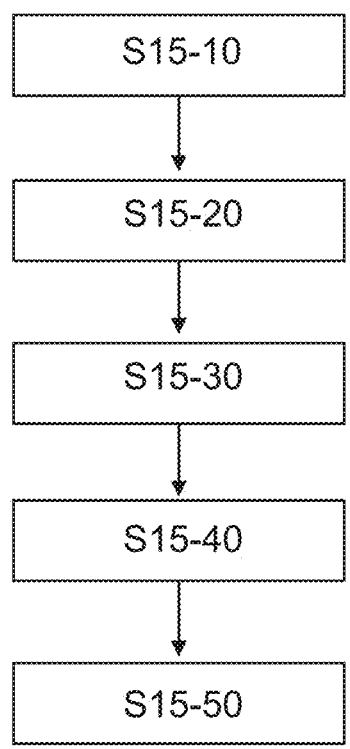
FIG. 15 is a diagram illustrating a workflow according to an example.

In FIG. 15, a workflow is shown in which the location matching as herein described is used indirectly for determining like image regions in two medical imaging data sets.

At step S15-10, a first region of interest in the first medical imaging data 220 is determined. The first region of interest may be seen as the image portion for which a corresponding portion is to be identified in the second medical imaging data 330. The first region of interest may, in particular, be an image region the image data of which is not suited for the location matching based on extracting descriptors as herein described. This may be the case if the image pattern in the first region of interest does not have a sufficient discriminative strength to, e.g., sufficiently stand out against the background. For instance, this may happen if the first region of interest has a rather uniform appearance without any remarkable features.

The first region of interest may represent an area within the first medical imaging data 220, which is of specific interest for the user analyzing the first medical imaging data 220. The first region of interest may be a part of the first medical imaging data 220. As such, the first region of interest may have an arbitrary shape, preferably the region of interest is of circular or quadratic or box-like form. In any case, a first region of interest may be understood as a group of image elements like pixels or voxels within the first medical imaging data 220.

The first region of interest may be defined by a user or semi-automatically or (fully-) automatically by the computer-implemented method. Thus, obtaining the first region of interest may be based on processing one or more user inputs to designate the first region of interest in the first medical imaging data 220. For instance, such user inputs may comprise scrolling to a target slice and/or defining a region of interest in the target slice.

Further, obtaining the first region of interest may comprise automatically identifying an anatomical feature in the first medical imaging data 220 wherein the anatomical feature is indicative of a pathological condition of a patient. In particular, this may involve applying a detection function configured to identify anatomical features in medical imaging data.

At step S15-20, the first location is selected. In particular, the first location may be at a different location than the first region of interest. The first location may relate to a given feature in the first medical imaging data 220 which can be easily recognized in both the first and second medical imaging data. In other words, the first location may be automatically selected so as to have a good discriminative strength in the first and/or the second medical imaging data. For instance, the selection may be related to a particularly bright image area or a particular image pattern.

At step S15-30, an offset between the first region of interest and the first location is obtained. Optionally, this offset is provided in generalized or world coordinates that are equally applicable to the first and the second medical imaging data.

At step S15-40, the selected second candidate location is obtained as described above. In other words, a location is identified in the second medical imaging data 330 that represents the given feature of the first location.

At step S15-50, a second region of interest in the second medical imaging data 330 is determined based on the selected candidate second location and the offset. With that, a region is retrieved in the second medical imaging data 330 that corresponds to the first region of interest in the first medical imaging data 220. The second region of interest is part of the second medical imaging data 330. The second region of interest may have the same shape as the first region of interest. A second region of interest may be understood as a group of image elements like pixels or voxels within the second medical imaging data 330.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A computer implemented method of determining a location at which a given feature is represented in medical imaging data, the medical imaging data comprising an array of elements each having a value, the method comprising:
   obtaining a first descriptor for a first location in first medical imaging data, wherein the first location is the location within the first medical imaging data at which the given feature is represented, wherein the first descriptor is representative of values of elements of the first medical imaging data located relative to the first location according to a first predefined pattern, wherein the first predefined pattern comprises sampling areas that entirely cover the first medical imaging data, wherein the sampling areas are defined around respective sampling points, wherein the sampling areas get larger with increasing distance of the respective sampling points to the first location;
   obtaining a second descriptor for each of a plurality of candidate second locations in second medical imaging data, wherein each second descriptor is representative of values of elements of the second medical imaging data located relative to the respective candidate second location according to the first predefined pattern;

calculating, for each of the plurality of candidate second locations, a similarity metric indicating a degree of similarity between the first descriptor and the second descriptor for the candidate second location;

selecting a candidate second location from among the plurality of candidate second locations based on the calculated similarity metric being above a pre-set threshold value; and determining the location at which the given feature is represented in the second medical imaging data based on the selected candidate second location.

2. The computer implemented method according to claim 1, wherein the method further comprises:

generating output data indicating the determined location at which the given feature is represented in the second medical imaging data.

3. The computer implemented method according to claim 2, wherein the method further comprises:

transmitting the output data to a display device to display a representation of the second medical imaging data and an indicator indicating, on the representation of the second medical imaging data, the determined location at which the given feature is represented.

4. The computer implemented method according to claim 1, wherein determining the location at which the given feature is represented comprises determining, as the location at which the given feature is represented in the second medical imaging data, the selected candidate second location.

5. The computer implemented method according to claim 1, wherein each candidate second location is a location at which a respective previously detected feature is represented in the second medical imaging data.

6. The computer implemented method according to claim 5, wherein the first descriptor for the first location in the first medical imaging data is obtained for each of a plurality of said given features and wherein the method comprises:

calculating said similarity metric between the first and second descriptors for pairs of the first locations and candidate second locations;

assigning each first location a different one of the candidate second locations based on the calculated similarity metrics between the pairs of the first locations and candidate second locations; and determining, for each said first location, as the location at which the respective said given feature is represented in the second medical imaging data, the second candidate location assigned to the first location.

7. The computer implemented method according to claim 1, wherein the candidate second locations are locations distributed through the second medical imaging data in a second predefined pattern.

8. The computer implemented method according to claim 7, wherein determining the location at which the given feature is represented in the second medical imaging data comprises:

determining, based on the selected candidate second location, a plurality of candidate third locations in the second medical imaging data, obtaining a third descriptor for each of the plurality of candidate third locations in the second medical imaging data, each third descriptor being representative of values of elements of the second medical imaging data located relative to the respective candidate third location according to the first predefined pattern;

calculating, for each of the plurality of candidate third locations, a similarity metric indicating a degree of similarity between the first descriptor and the third descriptor for the candidate third location;

selecting a candidate third location from among the plurality of candidate third locations based on the calculated similarity metrics indicating the degree of similarity between the first descriptor and the respective third descriptors; and determining the location at which the given feature is represented in the second medical imaging data based on the selected candidate third location.

9. The computer implemented method according to claim 8, wherein the candidate third locations are locations distributed through the second medical imaging data in a third predefined pattern in a region of the selected candidate second location, wherein a distance between the candidate third locations in the third predefined pattern is less than a distance between the candidate second locations in the second predefined pattern.

10. The computer implemented method according to claim 1, wherein a descriptor for a given location is a vector comprising a plurality of entries, each entry being representative of the values of the elements located within a respective one of a plurality of predefined boxes located relative to the given location according to the first predefined pattern, wherein a size or aspect ratio of the plurality of predefined boxes is randomly or pseudo-randomly generated.

11. The computer implemented method according to claim 10, wherein each entry of the plurality of entries of the vector is a sum of the values of elements located within a respective one of the plurality of predefined boxes.

12. The computer implemented method according to claim 1, wherein the first predefined pattern is a sampling grid comprising a plurality of grid points located relative to a given location, and a descriptor for the given location is a vector comprising a plurality of entries, wherein each entry is representative of the values of the elements located relative to a respective one of the plurality of grid points.

13. The computer implemented method claim 12, wherein a density of grid points per elements of first and second medical imaging data decreases with increasing distance to the given location.

14. The computer implemented method according to claim 1, wherein each entry of the first descriptor or the second descriptor is an aggregate of the values of elements intersecting with a respective one of a plurality of randomly oriented rays originating from a given location.

15. The computer implemented method according to claim 1, further comprising:

obtaining a first region of interest in the first medical imaging data;

determining an offset between the first region of interest and the first location; and determining a second region of interest in the second medical imaging data based on the location and the offset.

16. The computer implemented method according to claim 1, wherein the medical imaging data is integral image data.

17. The computer implemented method according to claim 1, wherein the similarity metric comprises a normalized mutual information similarity between the first descriptor and the second descriptor.

18. An apparatus, comprising:
a non-transitory memory device for storing computer readable program code; and
a processor in communication with the non-transitory memory device, the processor being operative with the computer readable program code to perform operations for determining a location at which a given feature is represented in medical imaging data, the medical imaging data comprising an array of elements each having a value, the operations including
  obtaining a first descriptor for a first location in first medical imaging data, wherein the first location is the location within the first medical imaging data at which the given feature is represented, wherein the first descriptor is representative of values of elements of the first medical imaging data located relative to the first location according to a first predefined pattern, wherein the first predefined pattern comprises sampling areas that entirely cover the first medical imaging data, wherein the sampling areas are defined around respective sampling points, wherein the sampling areas get larger with increasing distance of the respective sampling points to the first location;
  obtaining a second descriptor for each of a plurality of candidate second locations in second medical imaging data, wherein each second descriptor is representative of values of elements of the second medical imaging data located relative to the respective candidate second location according to the first predefined pattern;
  calculating, for each of the plurality of candidate second locations, a similarity metric indicating a degree of similarity between the first descriptor and the second descriptor for the candidate second location;
  selecting a candidate second location from among the plurality of candidate second locations based on the calculated similarity metric being above a pre-set threshold value; and
  determining the location at which the given feature is represented in the second medical imaging data based on the selected candidate second location.

19. The apparatus of claim 18, wherein the processor is operative with the computer readable program code to generate output data indicating the determined location at which the given feature is represented in the second medical imaging data.

20. One or more non-transitory computer-readable media embodying instructions executable by machine to perform operations for determining a location at which a given feature is represented in medical imaging data, the medical imaging data comprising an array of elements each having a value, the operations comprising:
  obtaining a first descriptor for a first location in first medical imaging data, wherein the first location is the location within the first medical imaging data at which the given feature is represented, wherein the first descriptor is representative of values of elements of the first medical imaging data located relative to the first location according to a first predefined pattern, wherein the first predefined pattern comprises sampling areas that entirely cover the first medical imaging data, wherein the sampling areas are defined around respective sampling points, wherein the sampling areas get larger with increasing distance of the respective sampling points to the first location;
  obtaining a second descriptor for each of a plurality of candidate second locations in second medical imaging data, wherein each second descriptor is representative of values of elements of the second medical imaging data located relative to the respective candidate second location according to the first predefined pattern;
  calculating, for each of the plurality of candidate second locations, a similarity metric indicating a degree of similarity between the first descriptor and the second descriptor for the candidate second location;
  selecting a candidate second location from among the plurality of candidate second locations based on the calculated similarity metric being above a pre-set threshold value; and
  determining the location at which the given feature is represented in the second medical imaging data based on the selected candidate second location.

* * * * *